United States Patent
Halladay et al.

(10) Patent No.: US 6,803,095 B1
(45) Date of Patent: Oct. 12, 2004

(54) COMPOSITE SHIMS HAVING A LAMINATE STRUCTURE

(75) Inventors: James R. Halladay, Harborcreek, PA (US); James A. Pike, Fairview, PA (US); William J. Galloway, Erie, PA (US); Thomas R. Pherson, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/672,437

(22) Filed: Sep. 28, 2000

(51) Int. Cl.[7] ............... D04H 13/00; D04H 3/00; B32B 9/04; F16C 17/04; F16C 33/00

(52) U.S. Cl. .................. 428/292.1; 428/411.1; 384/626; 384/221; 384/907; 384/911; 508/100

(58) Field of Search ................ 428/292.1, 411.1; 384/221, 904, 907, 911, 626; 74/574; 188/378; 508/100

(56) References Cited

U.S. PATENT DOCUMENTS

| | | | |
|---|---|---|---|
| 3,083,065 A | 3/1963 | Hinks et al. ............. 308/237 |
| 3,787,102 A | 1/1974 | Moran ..................... 308/26 |
| 3,869,113 A | 3/1975 | Dudek ..................... 267/57.1 |
| 3,941,433 A | 3/1976 | Dolling et al. ........... 308/2 R |
| 4,063,787 A | 12/1977 | Bakken et al. ........... 308/26 |
| 4,108,508 A | 8/1978 | Clinard, Jr. .............. 308/238 |
| RE30,262 E | 4/1980 | Schmidt et al. .......... 267/152 |
| 4,207,778 A | * 6/1980 | Hatch ..................... 74/572 |
| 4,263,243 A | 4/1981 | Wilson et al. ............ 264/137 |
| 4,286,827 A | 9/1981 | Peterson et al. ......... 308/26 |
| 4,435,097 A | 3/1984 | Peterson .................. 384/221 |
| 4,568,245 A | 2/1986 | Hibyan et al. ........... 416/134 A |
| 4,660,435 A | 4/1987 | Davis et al. .............. 74/572 |
| 4,708,758 A | 11/1987 | McGregor ............... 156/245 |
| 4,817,453 A | 4/1989 | Breslich, Jr. et al. ..... 74/572 |
| 4,942,075 A | 7/1990 | Hartel et al. ............. 428/109 |
| 5,054,224 A | 10/1991 | Friar et al. ............... 42/76.02 |
| 5,285,699 A | 2/1994 | Walls et al. .............. 74/572 |
| 5,297,874 A | 3/1994 | Raines ..................... 384/221 |
| 5,363,929 A | * 11/1994 | Williams et al. ......... 175/107 |
| 5,380,480 A | 1/1995 | Okine et al. ............. 264/316 |
| 5,399,309 A | 3/1995 | Simmons ................. 264/257 |
| 5,415,079 A | 5/1995 | Ching ..................... 92/169.2 |
| 5,551,918 A | 9/1996 | Jones et al. .............. 464/80 |
| 5,667,866 A | * 9/1997 | Reese, Jr. ................ 428/116 |
| 5,758,795 A | 6/1998 | Johnson .................. 220/564 |
| 5,855,984 A | * 1/1999 | Newton ................... 428/118 |

FOREIGN PATENT DOCUMENTS

| | | |
|---|---|---|
| JP | 2072232 | 3/1990 |
| WO | WO 00/65115 | 11/2000 |

* cited by examiner

Primary Examiner—Cynthia H. Kelly
Assistant Examiner—Camie S Thompson
(74) Attorney, Agent, or Firm—Edward F. Murphy, III

(57) ABSTRACT

A composite shim is provided having a laminate structure that includes a composite layer having at least one circumferential fiber. The composite layer may be in combination with composite layers with radially oriented fibers, uniaxially oriented fibers, and/or biaxially extending fibers. By employing such laminate structures, the present invention may provide shims that have the desired strength and stiffness characteristics of metallic shims while possessing the beneficial weight characteristics generally associated with composite shims. Laminated bearings containing such composite shims are also provided.

43 Claims, 10 Drawing Sheets

COMPOSITE SHIMS HAVING A LAMINATE STRUCTURE

FIELD OF THE INVENTION

This invention relates to composite shim structures. More particularly, this invention relates to composite shim structures for use in high capacity laminated bearings.

BACKGROUND OF THE INVENTION

It is generally known that the compressive load carrying capacity of resilient material may be increased by forming a lamination that includes alternating layers of resilient material and non-extensible material where the layers are oriented generally perpendicular to the direction of the anticipated compressive load. Such laminations have been used as bearings. One such bearing, commonly known as a high capacity laminated (HCL) bearing, has found commercial acceptance for a variety of applications including use as helicopter rotor bearings.

The commercial acceptance of HCL bearings may be due to the unique characteristics provided by their laminate structure. The laminate structure may increase the compressive load carrying capacity of the resilient material while retaining the ability of the resilient material to yield in shear or in torsion directions parallel to the laminations. As the expected compressive load increases, the rubber layers may have to be kept thin to reduce compression bulge strains. However, an overall thickness of rubber may be needed to accommodate torsional motion. Thus, a significant number of resilient layers may be needed to support a given load. Accordingly, a significant number of non-extensible layers, commonly known as shims, may also be required.

Shims should be capable of handling compressive loads on the bearing as well as supporting stresses in the radial and circumferential directions. Shims are typically thin metal plates, formed of brass, aluminum, titanium, steel or stainless steel. While metallic shims may provide the desired physical characteristics for many applications, these shims may increase the bearing cost and add a significant amount of unwanted weight to the bearing structure, particularly when a large number of layers are required to obtain the desired torsional characteristics. In some instances metal shims do not have sufficient strength or stiffness to endure the continuous loading that is experienced in some applications.

Composite or reinforced plastic shims may also be used in place of metal shims or in cases where metal shims are not adequate. Examples of such composite shims are taught in U.S. Pat. No. 4,108,508 to Clinard, Jr., which is assigned to the present assignee, as well as in U.S. Pat. Nos. 4,263,243 to Wilson et al., 4,708,758 to McGregor, and 5,297,874 to Raines. While composite shims may provide the desired reduction in bearing weight and cost, these shims may not provide other desired physical characteristics such as high strength and high stiffness.

The foregoing illustrates limitations known to exist in present devices and methods. Thus it is apparent that it would be advantageous to provide an alternative directed to overcoming one or more of the limitations set forth above. Accordingly, suitable alternatives are provided including features more fully disclosed hereinafter.

SUMMARY OF THE INVENTION

It is, therefore, an object of the present invention to provide a shim that may combine the desired physical characteristics of a metallic shim with the weight and cost characteristics of a composite shim.

It is another object of the present invention to provide a shim that has a greater strength and stiffness than a metal shim.

It is another object of the present invention to provide bearing configurations utilizing such shims.

These and other objects may be provided in one aspect of the invention by providing a composite shim having a laminate structure that includes a first composite layer having at least one fiber that substantially surrounds a portion of the layer, such as the center of the first composite layer for example. The composite shim may include more than one first composite layer. By employing such laminate structures, the present invention may provide shims that possess better strength and stiffness characteristics than those possessed by metallic shims as well as the desirable weight and cost characteristics generally associated with composite shims.

According to one embodiment of the present invention, the at least one fiber of the first composite layer is comprised of a fiber that forms a spiral pattern. According to another embodiment of the invention, the at least one fiber of the first composite layer is comprised of a plurality of concentric circumferentially extending circles. According to other embodiments of the present invention the first composite layer may also be comprised of a combination of at least one radially oriented fiber and at least one fiber oriented circumferentially.

According to another embodiment of the present invention, the laminate structure of the composite layers comprises at least one second composite layer that includes at least one fiber that is substantially radially oriented.

According to another embodiment of the present invention, the laminate structure comprises at least one third composite layer that includes at least one fiber oriented uniaxially. The laminate structure of the invention may include a plurality of third composite layers each having the respective at least one fiber oriented along an axis with the third composite layers of the laminate structure arranged so that the axes of consecutive third composite layers are offset by an angle. The consecutive third composite layers may be adjacent or may be separated by a first or second composite layer. The axes of the fibers may be arranged so that the layers are oriented at either 0°, +45°, −45° or 90°.

According to another aspect of the present invention, the composite shim is comprised of a laminate structure that includes a combination of the first, second, and third composite layers.

According to another embodiment of the present invention, a laminated bearing structure includes a plurality of resilient layers and a plurality of shims alternating with and laminated to the plurality of resilient layers. At least one of the shims is a composite shim having a laminate structure. The laminate structure includes a first composite layer having at least one fiber that substantially surrounds a predetermined location along the first composite layer.

According to another embodiment of the present invention the laminated structure of the present invention is tubular and includes a plurality of fibers oriented circumferentially around an axis and a plurality of fibers oriented substantially parallel to the axis.

The foregoing and other aspects of the invention will become apparent from the following detailed description of the invention when considered in conjunction with the accompanying drawing figures.

DETAILED DESCRIPTION OF THE PREFERRED EMBODIMENTS

Figure 1:
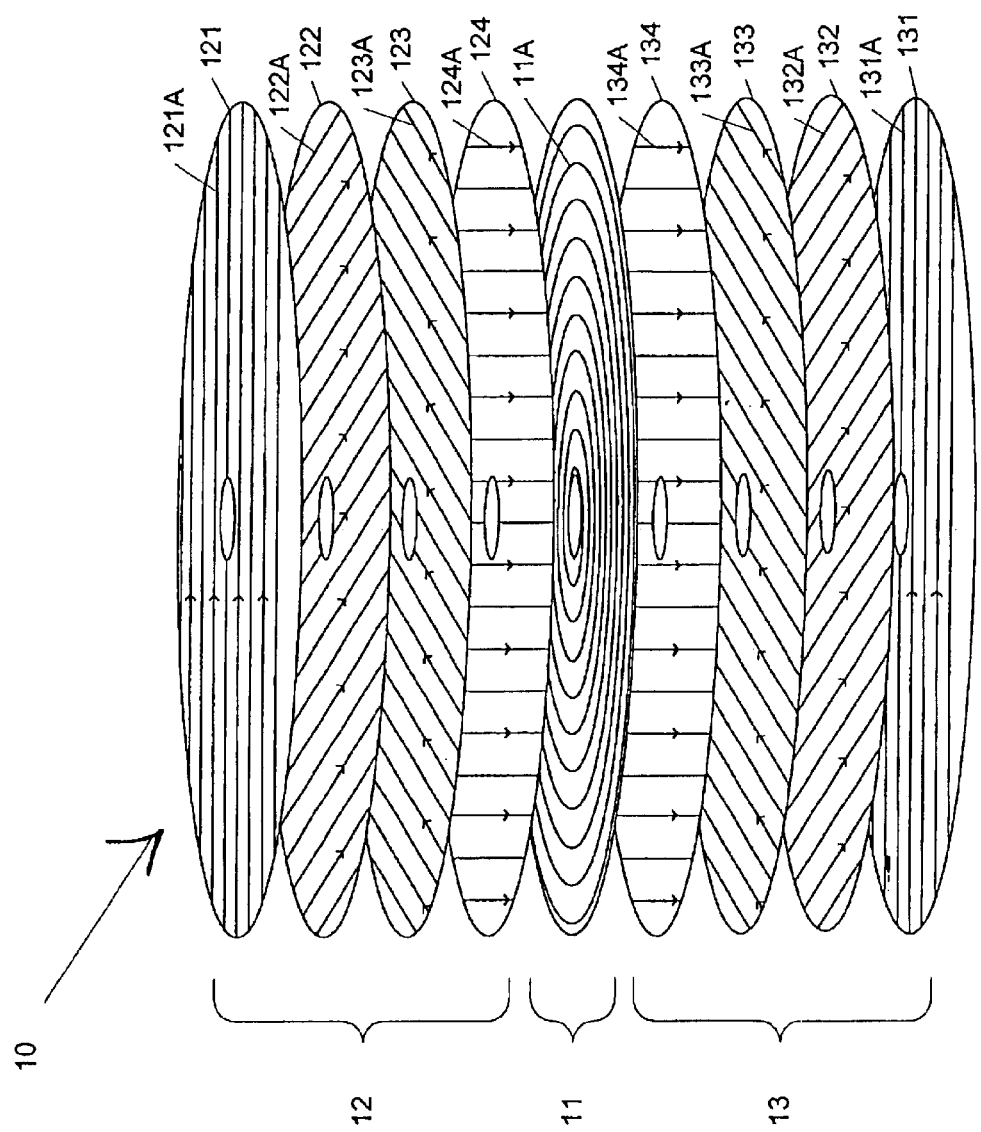
FIG. 1 is a schematic diagram illustrating an exploded view of an embodiment of a composite shim according to the present invention where the composite shim has a composite layer with a fiber that surrounds the central portion of the layer in a spiral pattern and also has a number of composite layers that include uniaxial fibers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

A number of embodiments of the composite shim of the present invention are disclosed in the following specification and the composite shims are generally referred to hereinbelow by reference characters 10, 10A, 10B, 10C, 10D, 10E, 10F, 10G, and 10H.

Figure 8:
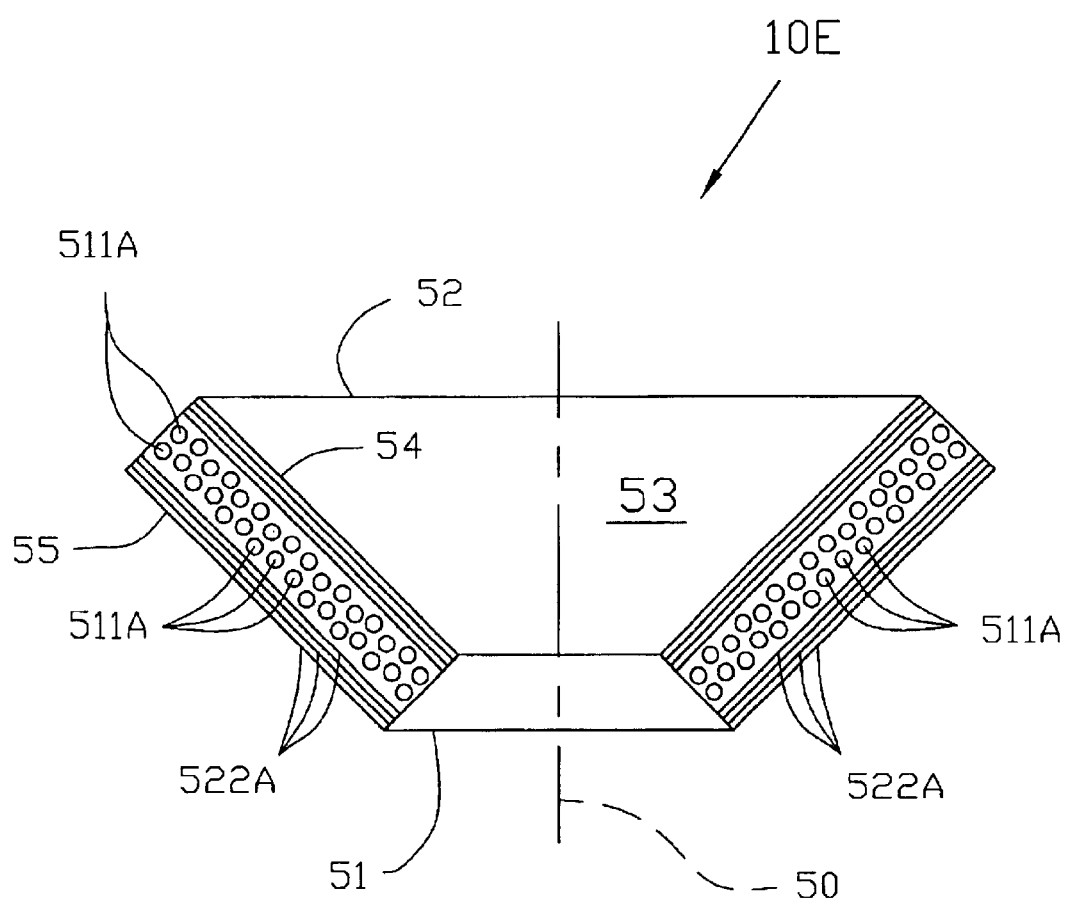
FIG. 8 is a longitudinal sectional view of a frustoconical composite shim.

Referring to FIG. 1, an embodiment of a composite shim 10 having a laminated structure according to the present invention will now be described. Although the composite shim 10 is shown as a flat shim, composite shims of the present invention may be formed in various shapes known to those skilled in the art including, but not limited to, flat, spherical, conical and frustoconical. An example of a conical shim is illustrated in FIG. 8 and will be described hereinbelow.

The composite shim 10 includes a first composite layer 11, a second composite layer 12 and a third composite layer 13. While this embodiment shows three composite layers, it is to be understood that composite shims of the present invention may include more or less than three composite layers. Additionally, although the composite shim is shown and described as having a circular configuration, it should be understood that the composite shim may be non-circular. For example, the composite shim may be oblong, oval, or square with rounded corners.

For clarity, although the general term "layer" is used to refer to the discrete members that comprise laminate member or shim 10, one skilled in the art might also refer to such layers as "plys" or "laminae."

Figure 2:
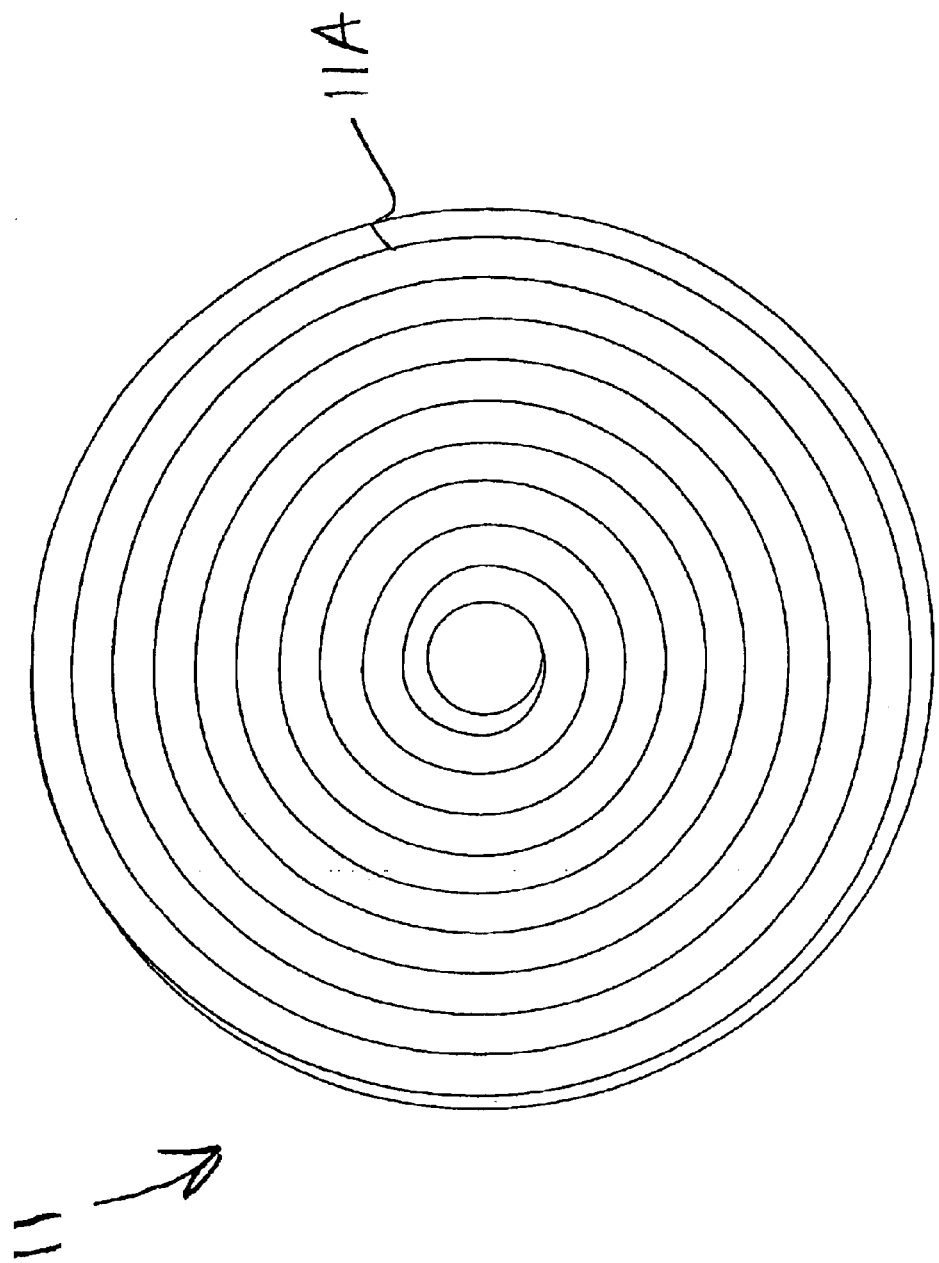
FIG. 2 is a schematic diagram illustrating a composite layer having a fiber that surrounds the central portion of the layer in a spiral pattern.

The first composite layer 11 contains a fiber 11A. The fiber 11A surrounds the central portion of the layer and may be thought of as forming a spiral pattern on a composite layer as illustrated in FIG. 2. While the illustrated embodiment of FIG. 1 contains only one composite layer 11, it is to be understood that composite shims of the present invention may contain a plurality of such layers. For example, in the illustrated embodiment, additional composite layers having fiber 11A that surrounds the central portion of the layer 11 could be located above the second composite layer 12 (i.e. on the composite sublayer 121) and/or below the third composite layer 13 (i.e. on the composite sublayer 131).

Figure 3:
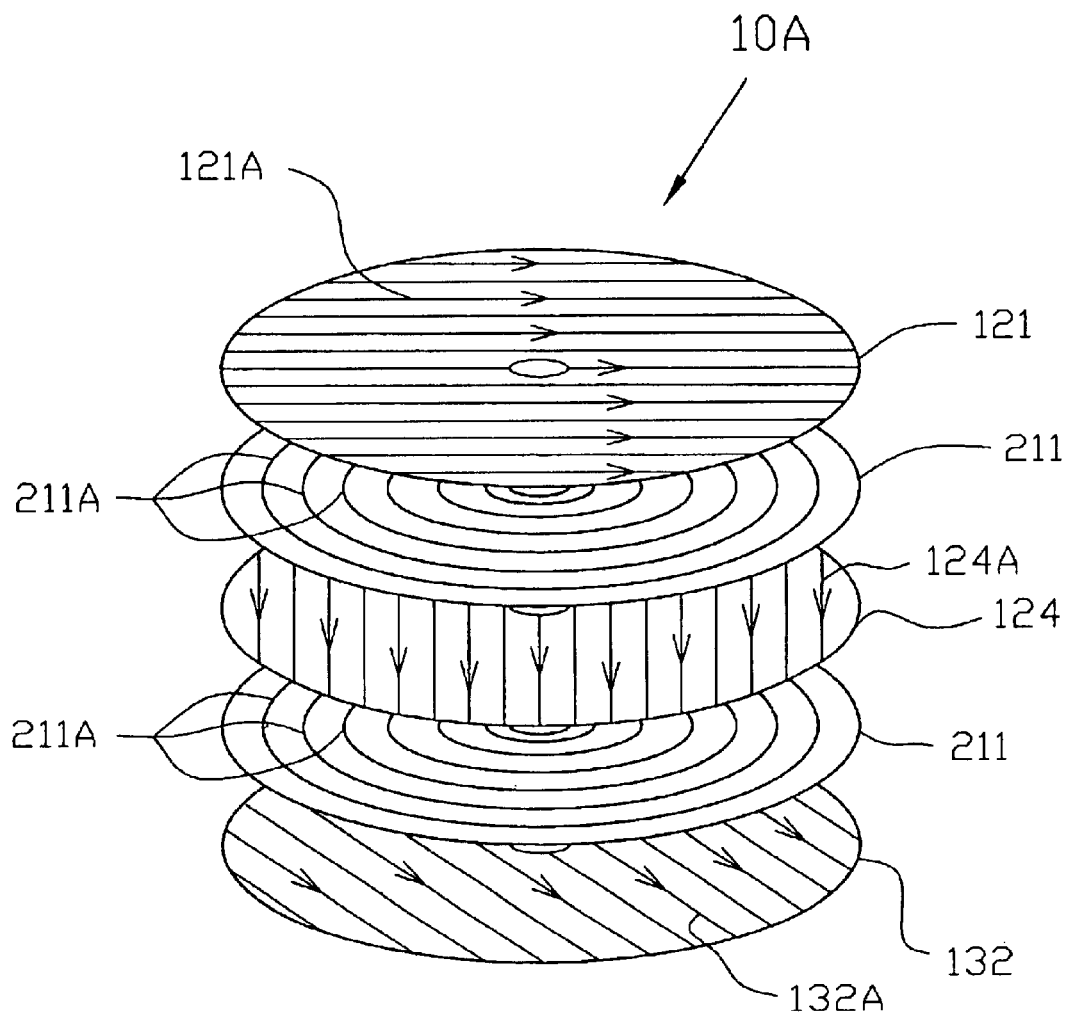
FIG. 3 is a schematic diagram illustrating an exploded view of an embodiment of a composite shim according to the present invention where the composite shim has a number of composite layers with fibers oriented as concentric circles and a number of composite layers with fibers oriented uniaxially.
Figure 4:
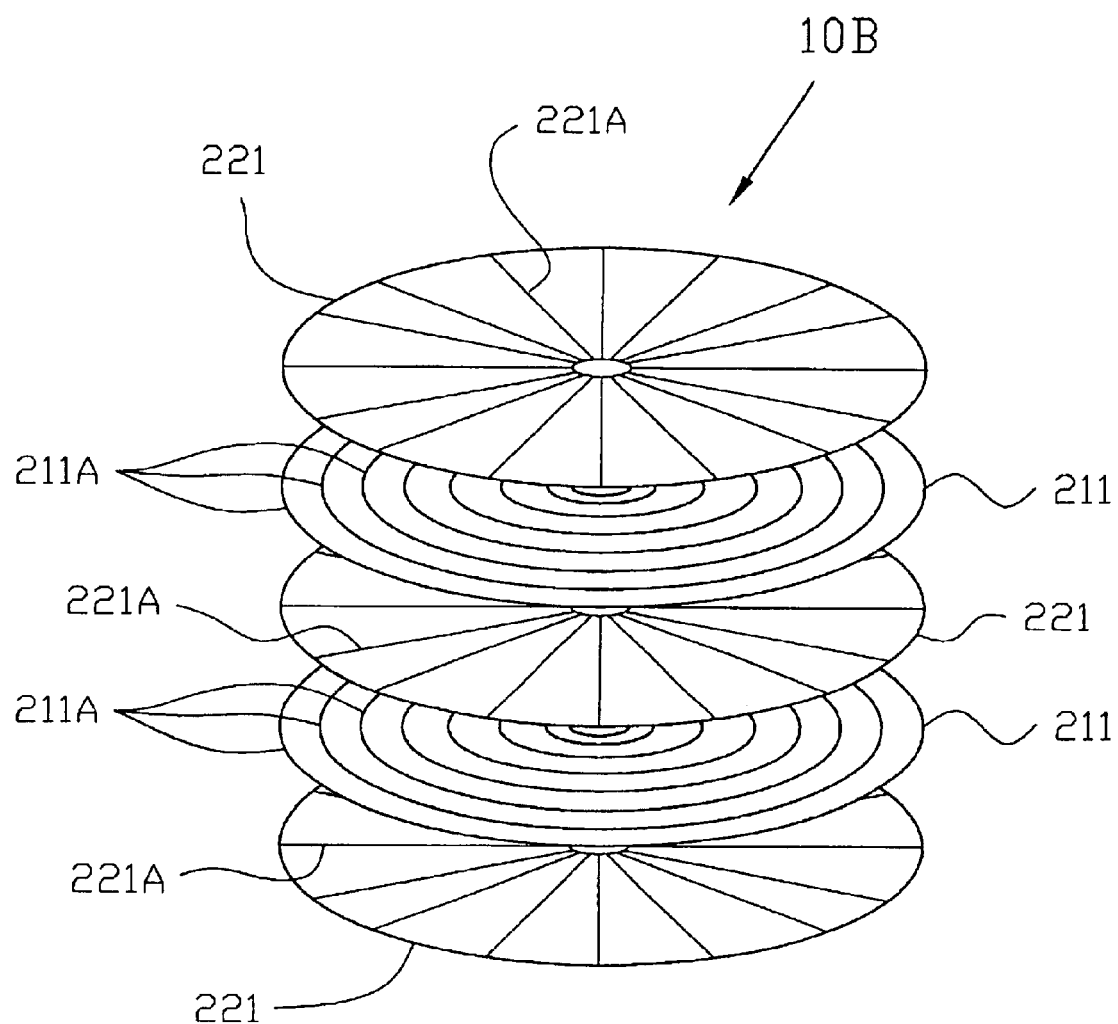
FIG. 4 is a schematic diagram illustrating an exploded view of an embodiment of a composite shim according to the present invention where the composite shim has a number of composite layers with fibers oriented radially and a number of composite layers with fibers oriented as concentric circles.

Although the illustrated embodiment of FIG. 1 contains a first composite layer having a spiral wound fiber, it is to be understood that the spiral wound fibers are merely one embodiment of fibers that are substantially concentrically oriented. More particularly, the spiral fibers are merely one embodiment of arcuate shaped fibers that are substantially concentrically oriented. Another embodiment of arcuate shaped fibers are fibers that form substantially concentric rings. Such an embodiment is illustrated in FIGS. 3 and 4 which disclose laminate structure that includes layer 211 that include a plurality of concentric circles 211A that surround the center of the composite layer. Composite layers of the present invention that contain substantially concentrically oriented fibers may aid in resisting outwardly radial forces on shims. Such forces may occur in laminated bearings containing composite shims laminated to resilient layers as a result of the outwardly radial expansion of the resilient layers that occurs during axial loading of the bearing. For clarity, as the description proceeds the arcuate shaped fiber configurations of layers 11 and 211 shall be collectively referred to hereinafter as "circumferential fiber" or "circumferential fibers."

The laminate structures illustrated in FIGS. 3 and 4 will be described in further detail hereinbelow.

Returning to the laminate structure illustrated in FIG. 1, the composite layer 12 includes four composite sublayers 121, 122, 123 and 124. Similarly, the composite layer 13 includes four composite sublayers 131, 132, 133 and 134. While the second and third composite layers of the embodiment illustrated in FIG. 1 show four sublayers, it is to be understood that second and third composite layers according to the present invention may contain as few as zero (i.e. the first composite layer is a single layer structure) or as many as a thousand or more sublayers. If second and third composite layers include sublayers, they preferably have between about 2 and about 500 sublayers, more preferably between about 2 and about 50 sublayers, and, most preferably, between about 3 and about 10 sublayers. In general, these ranges as well as those noted below should be interpreted to include the endpoints. Furthermore, while the second and third composite layers of the embodiment shown in FIG. 1 contain the same number of sublayers, it is to be understood that second and third composite layers according to the present invention may also contain different numbers of sublayers.

In the illustrated embodiment of FIG. 1, each composite sublayer 121–134 contains uniaxial fibers illustrated by corresponding reference numerals with an "A" suffix. For example, composite sublayer 121 contains uniaxial fibers 121A. The uniaxial fibers in different sublayers may have different characteristics. For example, the uniaxial fibers 121A in sublayer 121 could be high modulus carbon fibers, while the uniaxial fibers 122A in sublayer 122 were low modulus carbon fibers. Similarly, all of the uniaxial fibers in layer 12 could be high modulus carbon fibers, while all of the uniaxial fibers in layer 13 were intermediate modulus carbon fibers.

The orientation of the uniaxial fibers of a given composite sublayer defines an axis as indicated by the arrows on the fibers. This axis will be referred to herein by a reference direction for purposes of comparing the relative orientation of the respective sublayers. However, it is to be understood that such reference directions or angles are merely relative and not absolute points of reference. Uniaxial fibers 121A are aligned in the 0° direction. Similarly, uniaxial fibers 122A are illustrated as aligned in the +45° direction, uniaxial fibers 123A in the −45° direction, and uniaxial fibers 124A in the 90° direction, all with reference to uniaxial fibers 121A. Thus, for the present embodiment, the four composite sublayers 121, 122, 123 and 124 of the second composite layer 12 are arranged such that their respective axes as defined by their uniaxial fibers are in a 0°, +45°, −45° and 90° orientation or lay-up. Similarly as shown in FIG. 1, the four composite sublayers 134, 133, 132, and 131 of the third composite layer 13 are arranged such that their respective axes are in a 90°, −45°, +45° and 0° orientation or lay-up. Thus, for the illustrated embodiment of FIG. 1, the composite sublayers of the second and third composite layers are symmetrical about the first composite layer 11. In other words, the composite sublayers 124 and 134 closest to the first composite layer 11 have the same orientation, 90°, the composite sublayers 123 and 133 next closest have the same orientation, −45°, etc. While the sublayers of the illustrated embodiment of FIG. 1 are symmetrically oriented about the first composite layer 11, it is to be understood that sublayers according to the present invention need not be symmetrically oriented.

As shown in the embodiment of FIG. 1, the composite sublayers 121–134 are arranged such that the axes of two adjacent composite sublayers (as defined by their respective fibers) are offset by an angle. For example, the axis of the composite sublayer 121 and the axis of the composite sublayer 122 are offset by a +45° angle. This offset angle is defined herein as the acute angle formed by the two axes, and as such, the angle may be any value between −90° and +90°.

Although specific angles of fiber orientation are shown and described herein for the uniaxial layers it should be understood that the uniaxial layers of the composite shim of the present invention may have fibers oriented at any suitable angle. Additionally, the shim of the present invention may be comprised of any suitable combination of uniaxial layers.

Alternate embodiment composite shims 10A and 10B are respectively disclosed in the FIGS. 3 and 4. As shown in FIG. 3, composite shim 10A, includes first composite layer 211 with circumferentially spaced fibers 211A that surround the central portion of the layer and sublayers 121, 124, and 132 that include respective uniaxial fibers 121A, 124A, and 132A. The layers 121, 124, and 132 and their respective fibers include all the characteristics and features as previously described hereinabove in conjunction with composite shim 10. Composite shim 10A includes layers 211 between consecutive uniaxial layers and each of the consecutive uniaxial layers 121, 124, and 132 has fibers oriented along a different axis.

Turning now to composite shim 10B disclosed in FIG. 4, like shim 10A, composite shim 10B includes first composite layer 211 with circumferentially spaced fibers 211A that surround the center of the layer. Also, shim 10B includes a plurality of alternating sublayers 221, that each comprising a plurality of spaced apart radial fibers 221A oriented radially from the center of the composite layer 221. In composite shim 10B layers 211 separate layers 221.

Figure 5:
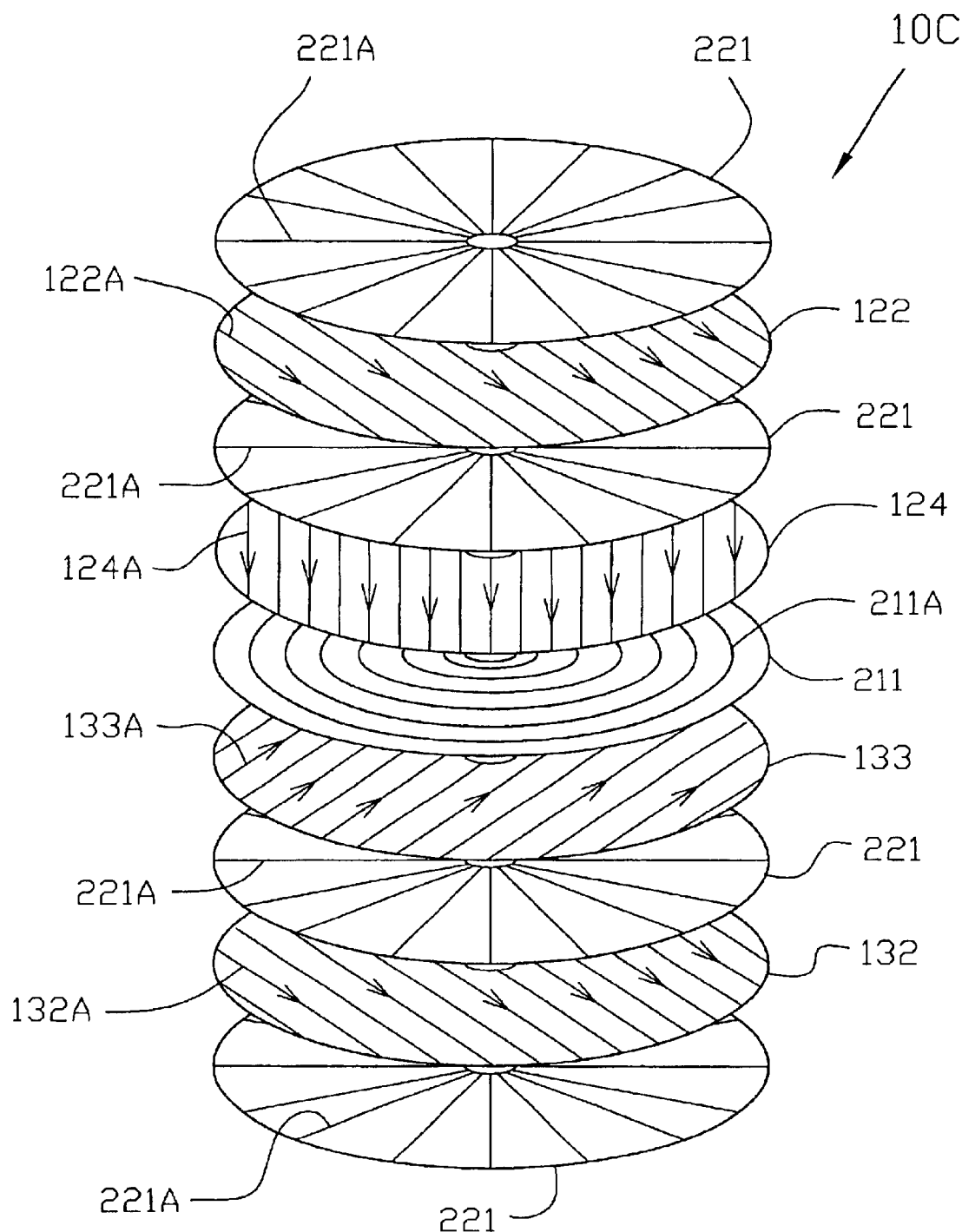
FIG. 5 is a schematic diagram illustrating an exploded view of an embodiment of a composite shim according to the present invention where the composite shim has a number of composite layers with fibers oriented radially, a number of composite layers with fibers oriented concentrically and a number of composite layers with fibers oriented uniaxially.

A further alternate embodiment composite shim 10C is illustrated in FIG. 5. The composite shim In FIG. 5 includes a combination of the previously described radial layers 221, concentric layers 211 and uniaxial layers 122, 124, 132, and 133. The radial layers and the concentric layer separate the consecutive uniaxial layers and the axes of the fibers of consecutive uniaxial layers are different.

Figure 6:
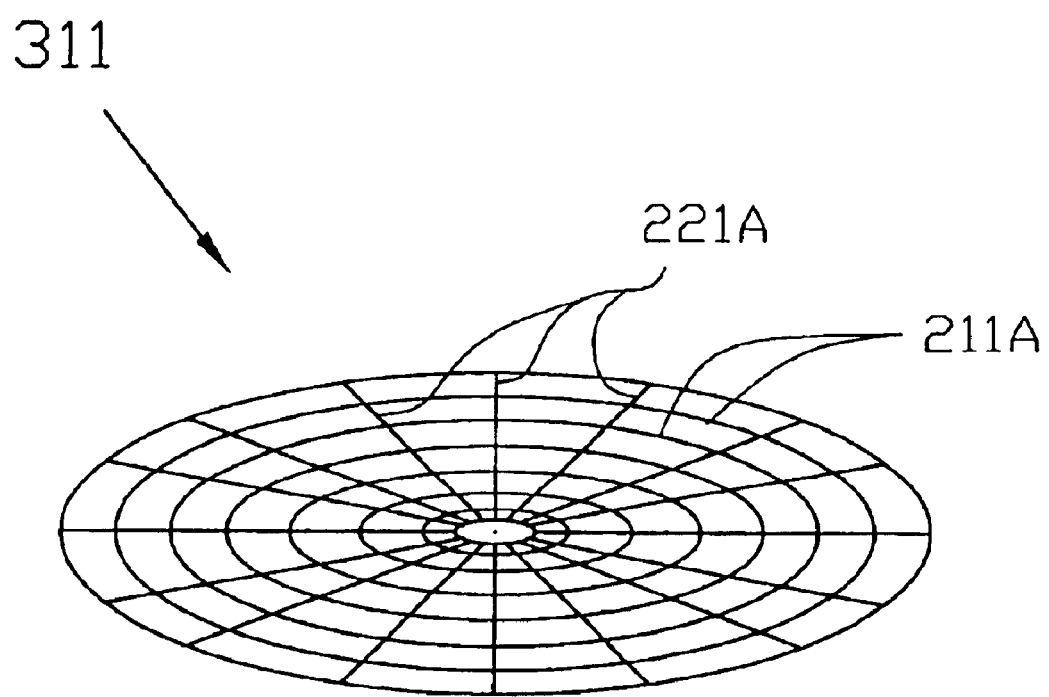
FIG. 6 is a schematic diagram illustrating a first composite layer having a combination of circumferential and radial layers of fiber.

Referring now to FIG. 6, an alternate embodiment composite first layer 311 is disclosed. The composite first layer is comprised of a network of radially oriented fibers 221A and concentric circles 211A. The first layer 311 may be included in any of the previously described composite shim embodiments 10, 10A, 10B, or 10C. The layer 311 may be comprised of a structure referred to by those skilled in the art as a "polar weave". The polar weave is comprised of a spiral or series of concentric circles that are joined to radially extending fibers 221A. Before the polar weave is laid up to form the planar layer 311, the spiral or concentric circles may be displaced or extended longitudinally like an accordion. The layer 311 may be comprised of one or more polar weave layers.

Figure 7:
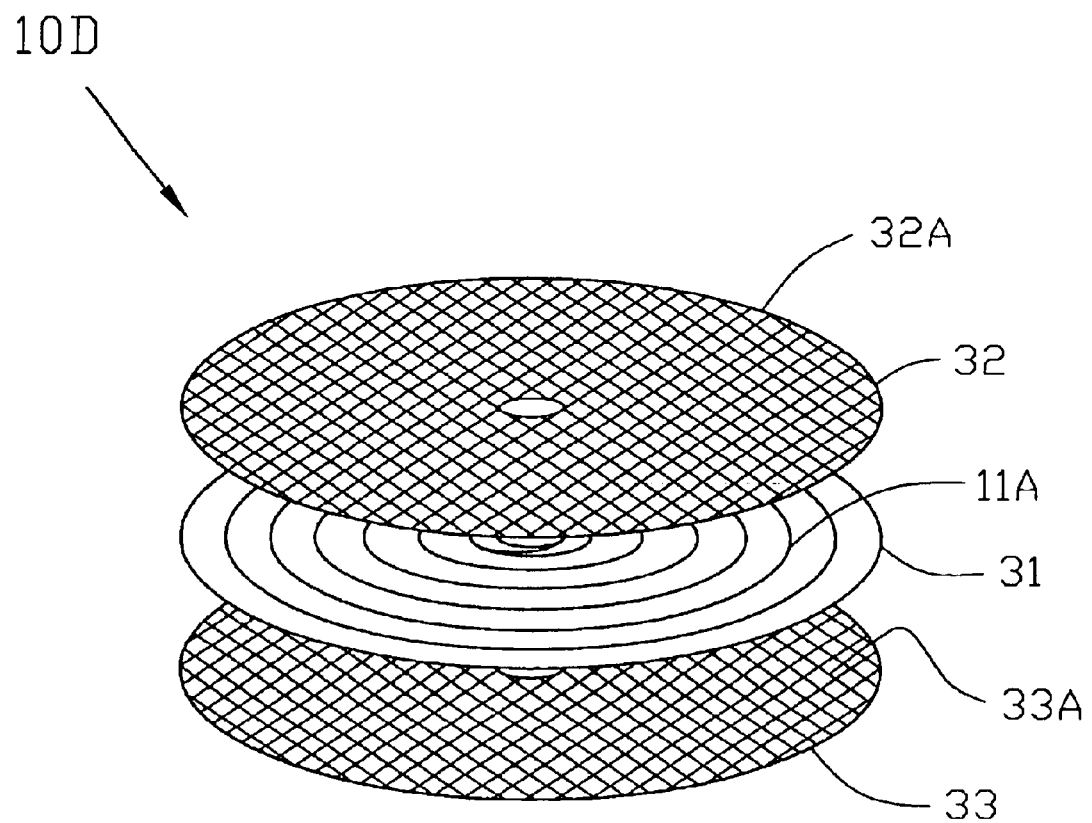
FIG. 7 is a schematic diagram illustrating an exploded view of an embodiment of a composite shim according to the present invention where the composite shim has composite layers that include biaxially oriented fibers.

Referring now to FIG. 7, a composite shim 10D having a laminated structure according to a second embodiment of the present invention will now be described. The composite shim 10D includes a first composite layer 31, a second composite layer 32 and a third composite layer 33. The first composite layer 31 as shown in FIG. 7 contains a circumferential fiber 11A. While the illustrated embodiment of FIG. 7 only shows one composite layer having circumferential fibers, it is to be understood that composite shims of the present invention may contain more than one such layer.

In FIG. 7 the second composite layer 32 includes fibers 32A forming a biaxial network of fibers. The network of fibers may be formed by various means known to those skilled in the art. For example, the network of fibers may form a cloth, which may be woven, knit, felt, needled, sewn or otherwise formed. Similarly, the third composite layer 33 includes fibers 33A forming a biaxial network of fibers. While a biaxial network of fibers is shown, it is to be understood that any multi-axial network of fibers may be used according to the present invention including a triaxial network of fibers. Although both the second composite layer 32 and the third composite layer 33 are shown in FIG. 7 as containing biaxial networks of fibers, the networks need not be the same. For example, the second composite layer 32 may contain a biaxial network of fibers while the third composite layer 33 contains a triaxial network of fibers.

FIG. 8 illustrates an alternate embodiment composite shim 10E of the present invention comprising a frustoconical shape. The shim 10E includes a central axis 50 and a plurality of circumferential fibers 511A that surround the central axis. As shown in FIG. 8 the fibers are spaced apart between the ends 51 and 52 of the frustoconical shim. The inner and outer walls 54 and 55 respectively of the frustoconical shim 10E are defined by a plurality of fibers 522A that also extend between the ends 51 and 52 and surround the axis 50. The inner wall defines hollow interior 53. The thickness of the shim is the distance separating the ends 51 and 52.

Figure 10A:
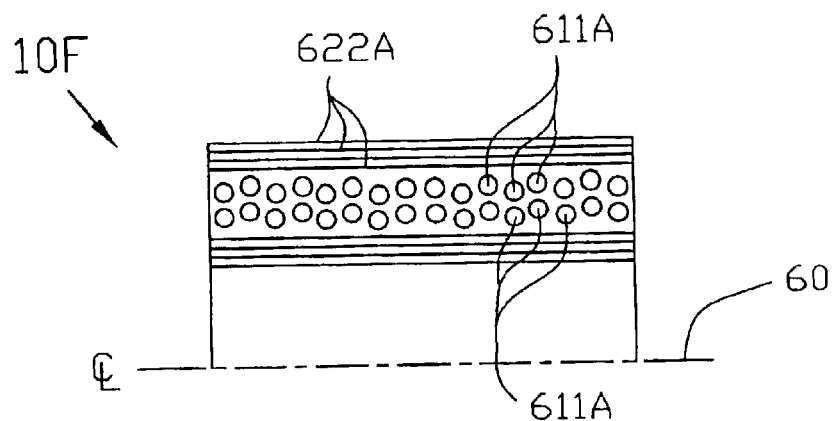
FIGS. 10a, 10b, and 10c are longitudinal cross sectional views of tubular composite shims.
Figure 10B:
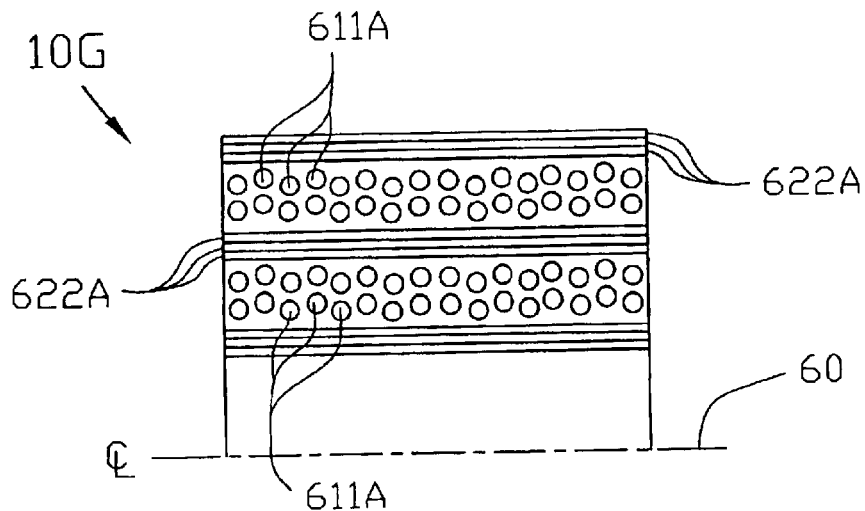
Figure 10C:
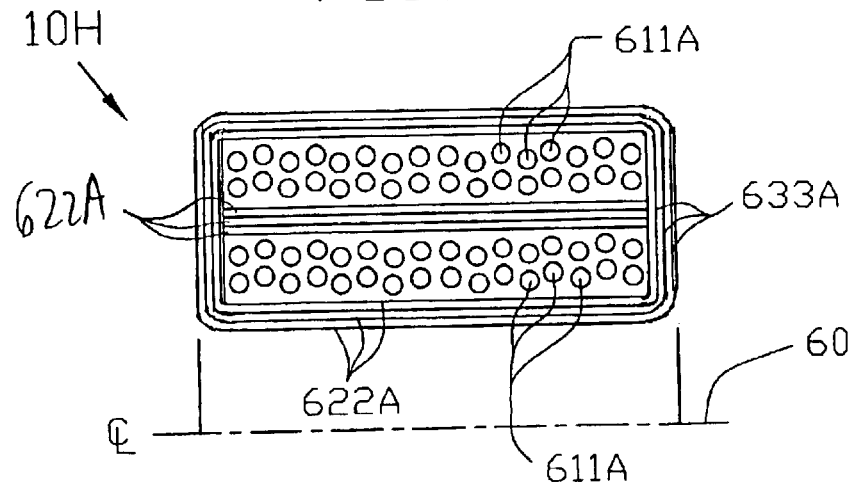

FIGS. 10a, 10b, and 10c illustrate further alternate embodiment composite shims generally identified as 10F, 10G, and 10H respectively in the FIGS. Each tubular composite shim 10F, 10G, and 10H includes a central longitudinal axis 60 with circumferential fibers that surround the central axis 60. These fibers are identified on each cylindrical shim as 611A. The circumferential fibers are enclosed by a plurality of longitudinally oriented uniaxial fibers 622A. As shown in FIGS. 10A–C, shims 10F, 10G, and 10H include longitudinally extending fibers which define the outer shim layers. Shims 10G and 10H also include a a longitudinally extending shim layer 622A between the outer and inner shim layers 622A. Shim 10H also includes laterally extending fibers 633A that are made intergral with longitudinal fibers 622A to completely surround the cylindrical shims 611A as shown in FIG. 10C.

It should be understood that although composite shims 10A–10H as shown and described comprise a finite number of layers, the composite shims 10A–10H include the multiple layers as described hereinabove in conjunction with the description of composite shim 10. Circumferential layers 11, 211, 511 and 611 may also be outside shim layers in addition to being the inner layers as described hereinabove.

Composite shims 10, and 10A–10H of the present invention may have certain size and physical characteristics. For example, a composite shim of the present invention may have a thickness between a lower limit and an upper limit. The lower limit may be preferably about 0.005 inches, more preferably about 0.01 inches, and most preferably about 0.025 inches. The upper limit may be preferably about 0.5 inches, more preferably about 0.25 inches, and most preferably about 0.1 inches.

Composite shims of the present invention may be formed by various methods known to those skilled in the art. For example the laid-up sublayers/layers may be vacuum bagged and oven or auto-clave cured. Preferably, the laid-up sublayers/layers are cured using matched die molding, which may provide for tighter dimensional tolerances than vacuum-bag curing.

Composite layers and sublayers of the present invention preferably have certain size characteristics. For example, composite layers according to the present invention may have thicknesses between a lower limit and an upper limit. The lower limit may be preferably about 0.001 inches, more preferably about 0.002 inches, and most preferably about 0.004 inches. The upper limit may be preferably about 0.1 inches, more preferably about 0.05 inches, and most preferably about 0.02 inches. The thicknesses of various composite layers may be the same or different. Similarly, composite sublayers according to the present invention may have thicknesses between a lower limit and an upper limit. The lower limit may be preferably about 0.0005 inches, more preferably about 0.001 inches, and most preferably about 0.002 inches. The upper limit may be preferably about 0.05 inches, more preferably about 0.025 inches, and most preferably about 0.01 inches. The thicknesses of the composite sublayers within a given composite layer may be the same or different.

Composite layers and composite sublayers of the present invention may be formed by various methods known to those skilled in the art. For example, composite layers and composite sublayers of the present invention may be formed using prepregs or towpregs, by a wet lay-up method, or by filament winding. Fully cured layers can be used and adhered together by an adhesive.

Fibers used according to the present invention may be various fibers known to those skilled in the art. Suitable fibers include fibers made of glass, asbestos, graphite, carbon and boron, as well as synthetic polymeric fibers such as aramid and high molecular weight extended chain polyethylene fibers, aluminum fibers, aluminum silicate fibers, aluminum oxide fibers, titanium fibers, magnesium fibers, rock wool fibers, steel fibers and the like. Of these fibers, the preferred fibers are carbon fibers.

In addition to fibers, composite layers and composite sublayers according to the present invention may contain a matrix material. In general, the matrix material transfers loads to the reinforcing fibers and protects the fibers from the environment. The matrix material may be various materials known to those skilled in the art. For example, the matrix material may be a polymeric material, a ceramic material or a metal. Preferably, the matrix material is a polymeric material. The polymer matrix of the composite can be generally any normally solid polymer, including thermoset polymers such as epoxy resins, phenolic resins, polyester resins, cyanate resins, polyimides, polybenzimidazoles and bismaleirnide resins.

Representative examples of thermoset polymers which may be suitable for use in the practice of the present invention include thermoset phenolic resins such as thermosettable resins containing resorcinol, p-tertiary-octylphenol, cresol, alkylated phenolic novalac, phenolic polyvinyl butyral, and phenolic cresol and an aldehyde such as formaldehyde, acetaldehyde or furfural; thermoset polyimide resins such as those curable resins based on pyromellitic dianhydride, 3,3',4,4'-benzophenone-carboxylic dianhydride and meta-phenylenediamine; thermoset epoxides or epoxy resins such as the resins containing the reaction product of bisphenol A or derivatives thereof (e.g., the diglycidyl ether of bisphenol A) or a polyol such as glycerol with epichlorohydrin and a cross-linking or curing agent such as a polyfunctional armine, e.g., polyalkylenepolyamine; thermoset polyester resins such as the reaction products of an unsaturated dicarboxylic acid such as maleic or fumaric acid (which may be used in combination with a saturated acid such as phthalic or adipic acid) with a dihydric alcohol such as ethylene, propylene, diethylene and dipropylene glycol which cure upon using an ethylenic unsaturated curing agent such as styrene or diallyl phthalate, including thermnosettable allyl resins including resins derived from diallyl phthalates, e.g., diallyl orthophthalate, diallyl isophthalate, diallyl fumarates and diallyl maleates; thermoset polyurethanes including those derived from the reaction of a diisocyanate, e.g., toluene diisocyanate, methylene diphenyl diisocyanate, or isophorone diisocyanate, or a polymeric isocyanate with a polyhydric alcohol such as polypropylene glycol and, if required, an additional cross-linking agent such as water; thermoset urea resins; melamine resins, furan resins, and vinyl ester resins including epoxy (meth) acrylates; peek; ultrapek; pei; and polycarbonate. Of these polymers, the preferred polymers are epoxy resins.

Composite shims of the present invention may also include other materials such as fillers. Representative filler materials include calcium silicate, silica, clays, talc, mica, polytetrafluoroethylene, graphite, alumina trihydrate, sodium aluminum carbonate, barium ferrite and the like.

Figure 9:
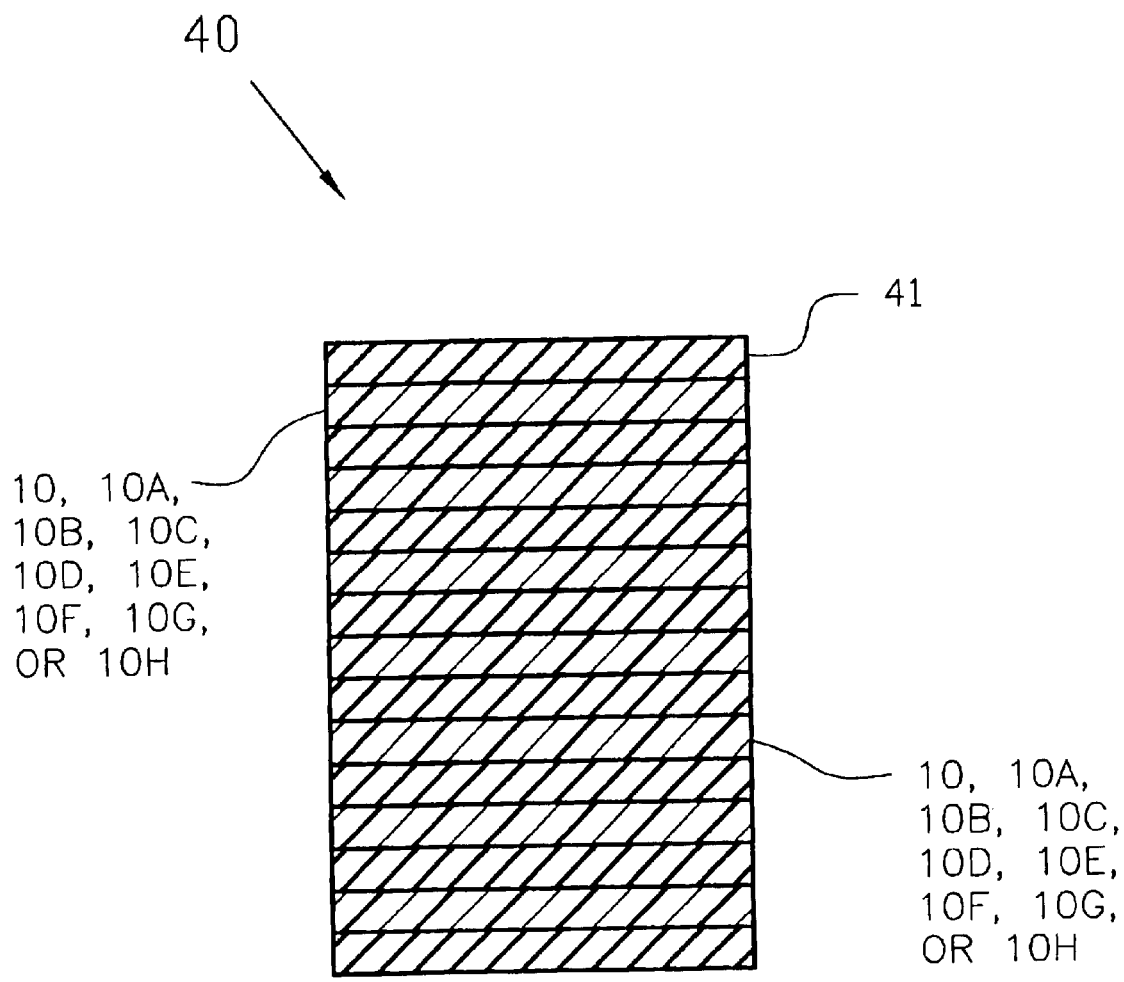
FIG. 9 is a schematic diagram illustrating an embodiment of a laminated bearing according to the present invention.

Referring now to FIG. 9, an embodiment of a laminated bearing 40 according to the present invention will now be described. The laminated bearing 40 contains a plurality of resilient layers 41 alternating with and laminated to a plurality of composite shims 10, 10A, 10B, 10C, 10D, 10E. While all of the shims in the laminated bearing illustrated in FIG. 9 are shown to be composite shims, it is to be understood that as few as one shim may define a composite bearing. Although eight resilient layers 41 are shown, it is to be understood that laminated bearings of the present invention may contain as few as two resilient layers. Also, laminated bearings of the present invention may contain as few as one composite shim 10, 10A, 10B, 10C, 10D or 10E. Additionally, while the laminated bearing 40 shows the resilient layers 41 as the exterior layers of the bearing, the composite shims may also be one or both of the exterior layers of the bearing. Although the laminated bearing 40 is shown to be cylindrical, it is to be understood that laminated bearings of the present invention may be of any shape known to one skilled in the art including spherical and frustoconical. While they are schematically illustrated as having to have the same thicknesses in FIG. 9, it is to be understood that the resilient layers 41 and the composite shims 10, 10A, 10B, 10C, 10D, or 10E according to the present invention may have different thicknesses. Furthermore, the thicknesses of the various resilient layers 41 themselves may be different. Similarly, the various composite shims may have different thicknesses and different lay-ups. The shims may be comprised of a combination of composite and metal shims and more specifically the composite shims may include different fiber orientations and the metal shims may be comprised of more than one type of metal shim. The discrete shim layers may have variable dimensions. For example, the shim may have an inward taper so that the outer shim peripheral portion has a greater thickness than the inner peripheral portion, or the diameter of the shim may vary axially.

The resilient layers 41 may be made of any resilient material known to one skilled in the art. Suitable resilient materials include rubbers such as natural rubber, brominated butyl rubber, chlorinated butyl rubber, polyurethane elastomers, fluoroelastomers, polyester elastomers, butadienelacrylonitrile elastomers, silicone elastomers, rubbers derived from conjugated dienes such as poly(butadiene), poly(2,3-dimethylbutadiene), poly(butadiene-pentadiene), and poly(isobutylene), ethylene-propylene-diene terpolymer (EPDM) rubbers and sulfonated EPDM rubbers, poly (chloroprene), chlorosulphonated or chlorinated poly (ethylenes), and poly(sulfide) elastomers. Other examples include block copolymers made up of segments of glassy or crystalline blocks such as poly(styrene), poly(vinyltoluene), poly(t-butyl styrene), polyester and the like and elastomeric blocks such as poly(butadiene), poly(isoprene), ethylene-propylene copolymers, ethylene-butylene copolymers, polyether ester and the like, e.g., poly(styrene),-poly(butadiene),-poly(styrene), and styrene butadiene block copolymers. Preferably, the resilient layers 41 include a blend of natural rubber and polybutadiene.

Additionally, the resilient layers 41 may include reinforcing fibers such as those described above. The resilient layers 41 may have a stated hardness as measured by various means recognized by those skilled in the art. For example, the hardness of resilient layers 41 may be measured according to the Shore Hardness A scale. The resilient layers 41 may have a Shore Hardness as measured on the Shore A scale between a lower limit and an upper limit. The lower limit may be preferably about 20, more preferably about 25, and most preferably about 30. The upper limit may be preferably about 95, more preferably about 85, and most preferably about 80. The resilient layers 41 may have thicknesses between a lower limit and an upper limit. The lower limit may be preferably about 0.005 inches, more preferably about 0.01 inches, and most preferably about 0.015 inches. The upper limit may be preferably about 1 inch, more preferably about 0.5 inches, and most preferably about 0.25 inches.

The composite shims 10, and 10A–10H are shims according to the present invention. As several embodiments of composite shims according to the present invention were described above with reference to FIGS. 1–8 and 10a–c they will not be described further.

Laminated bearings according to the present invention may be formed by any process known to one skilled in the art, including compression molding, transfer molding, injection molding and post-vulcanization bonding.

The physical characteristics of a laminated bearing of the present invention may be varied depending on the service requirements of the bearing. For example, shims of the present invention may be tailor-made and resilient layers may be selected to meet a given set of requirements.

The invention has been explained in general terms above. The following examples are provided to further illustrate the invention. In these examples, "lbs." means pounds and "in." means inches. Additionally, composite shims are described such that a composite shim having a lay-up of X°/Y°/Z° with a W° core would have the following structure: X°/Y°/Z°/W°/Z°/Y°/X°. In the following examples, all shims were conical in shape with the following size characteristics: 5.9" outside diameter, 2.7" inside diameter, 5° cone angle and 0.040" thickness.

COMPARATIVE EXAMPLE A

Several conical shims were axially tested to determine their individual spring rates using the following procedure. The shim was placed on the flat part of an Inston machine. An axial load was then applied to the top surface of the shim using a piston. The axial deflection of the shim at a load of 30 lbs. was recorded. The spring rate was then calculated as the axial load divided by the inches of deflection. Titanium, aluminum, and composite shims were tested. The composite shims had different lay-ups but did not include a circumferential fiber or fibers. The results are shown in Table A below.

TABLE A

| Material | Lay-up | Avg. Spring Rate (lbs./in.) |
| --- | --- | --- |
| Titanium | — | 1,150 |
| Aluminum | — | 1,050 |
| Composite | 0°/60°/−60° in a 12 layer design | 790 |
| Composite | 0°/60°/−60° extra 60° at core | 850 |
| Composite | 0°/60°/−60° extra 90° at core | 1,000 |

COMPARATIVE EXAMPLE B

An ultimate load test was performed on a high capacity laminated bearing made using composite shims having a 0°/60°/−60° lay-up in a 12 layer design. The ultimate load test was performed according to the following procedure. The bearing was placed on a flat surface such that the laminated layers of the bearing were parallel with the surface. An axial force was then applied to the upper surface of the bearing. The amount of force applied at the time the bearing buckled was recorded. Buckling was determined by visual inspection. The bearing buckled at approximately 230,000 lbs. compressive load.

EXAMPLE 1

Conical shims according to the present invention were axially tested using the procedure described above in Comparative Example A. The lay-up used here was a 0°/60°/−60° with a 0.020 inch central circumferential layer. The average spring rate of the shims was 1,428 lbs./in.

EXAMPLE 2

Conical shims according to the present invention were tested using the procedure described above in Comparative Example A. Shims having a lay-up of 0°/60°/−60°/90° with a 0.020 inch central circumferential layer and a shim having a lay-up of 0°/90° with a 0.020 inch center circumferential layer were tested. The average spring rate of shims having a lay-up of 0°/60°/−60°/90° with a hoop core was 1670 lbs./in. The results are shown in Table 2 below.

TABLE 2

| Material | Lay-up | Avg. Spring Rate (lbs./in.) |
|---|---|---|
| Composite | 0°/60°/−60°/90° with 0.20 inch circumferential layer | 1670 |

EXAMPLE 3

Thirty-three conical shims according to the present invention were axially tested using the procedure described above in Comparative Example A. The lay-up used here was a 0°/45°/−45°/90° with a 0.020 inch circumferential layer. The shims were tested to determine the variability of the process prior to the ultimate load test involving assembly into a high capacity laminated bearing. The spring rates of the shims tested ranged from 1,154 lbs./in. to 1,875 lbs./in. with an average spring rate of 1,582.

EXAMPLE 4

An ultimate load test was performed on a high capacity laminated bearing that contained conical composite shims according to the present invention that had a lay-up of 0°/45°/−45°/90° with a 0.020 inch circumferential layer. The ultimate load test was performed according to the procedure described above in Comparative Example B. The bearing buckled at approximately 374,000 lbs. compressive load.

As shown by the foregoing examples, composite shims of the present invention were analytically expected to possess better stiffness characteristics than conventional composite shims. For example, a composite shim of the present invention having a lay-up of 0°/60°/−60° with a 0.020 inch circumferential layer had an average spring rate of 1,428 lbs./in. compared to a conventional composite shim having a lay-up of 0°/60°/−60° with a 90° core, which only had an average spring rate of 1000 lbs./in.

In fact, composite shims of the present invention even possess better stiffness characteristics than metal shims made of titanium or aluminum. For example, a composite shim of the present invention having a lay-up 0°/60°/−60° with a 0.020 inch circumferential layer had an average spring rate of 1,428 lbs./in. compared to titanium and aluminum shims, having average spring rates of 1,150 lbs./in. and 1,050 lbs./in. respectively. Additionally, composite shims of the present invention are lighter than metal shims having similar stiffness characteristics, which may be beneficial in applications where weight is a concern, such as aviation applications.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A laminated bearing composite shim having a laminate structure, the composite shim is non-extensible and has a central axis, the composite shim having an outer circumference and comprising a first non-extensible composite layer including an epoxy matrix material and at least one spiral circumferential fiber that surrounds a portion of said first non-extensible composite layer with said at least one spiral circumferential fiber proximate said composite shim outer circumference, said spiral circumferential fiber in said epoxy matrix material of said first non-extensible composite layer of said nonextensible composite shim with said spiral circumferential fiber being oriented in a plane that is substantially perpendicular to said central axis.

2. A laminated bearing composite shim according to claim 1, wherein the laminate structure further comprises a second composite layer including a plurality of axial fibers, and wherein the first composite layer has a first side and a second side opposite the first side and the second composite layer has a first side and a second side opposite the first side, and wherein the first side of the first composite layer is laminated to the first side of the second composite layer.

3. A laminated bearing composite shim according to claim 1, wherein the at least one circumferential fiber is selected from the group consisting of carbon, graphite, glass, aramid and boron.

4. A laminated bearing composite shim according to claim 1, wherein the composite shim has a thickness between about 0.01 inches to about 0.5 inches.

5. A laminated bearing composite shim according to claim 2, wherein the laminate structure further comprises a third composite layer including at least one circumferential fiber with said third composite layer circumferential fiber proximate said composite shim outer circumference, and wherein the third composite layer is laminated to the second side of the second composite layer.

6. A laminated bearing composite shim according to claim 2, wherein the laminate structure further comprises a third composite layer including a plurality of axial fibers and wherein the third composite layer is laminated to the second side of the first composite layer.

7. A laminated bearing composite shim according to claim 6, wherein the second composite layer comprises a plurality of laminated composite sublayers, and wherein the third composite layer comprises a plurality of laminated composite sublayers.

8. A laminated bearing composite shim according to claim 6, wherein the second composite layer includes a layer selected from the group consisting of biaxial and triaxial woven cloth, and wherein the third composite layer comprises a layer selected from the group consisting of biaxial and triaxial woven cloth.

9. A laminated bearing composite shim according to claim 7, wherein the composite sublayers of the second and third composite layers include uniaxial fibers.

10. A laminated bearing composite shim according to claim 7, the uniaxial fibers of each of the composite sublayers of the second and third composite layers are oriented along an axis defining an axis of each of the composite sublayers, and wherein the composite sublayers are arranged such that the axes of adjacent composite sublayers are offset by an angle.

11. A laminated bearing composite shim according to claim 10, wherein the second composite layer includes at least four composite sublayers, and wherein the third composite layer includes at least four composite sublayers.

12. A laminated bearing composite shim according to claim 11, wherein the four composite sublayers of the second composite layer are arranged such that their respective axes are in a 0°, +45°, −45°, and 90° orientation, and wherein the four composite sublayers of the third composite layer are arranged such that their axes are in a 90°, −45°, +45°, and 0° orientation.

13. A laminated bearing composite shim having a laminate structure, the laminated bearing composite shim is non-extensible and has an outer circumference, said non-extensible laminated bearing composite shim comprising a first non-extensible composite layer including at least one spiral circumferential fiber that surrounds a portion of said first non-extensible composite layer with said at least one spiral circumferential fiber proximate said composite shim outer circumference.

14. A laminated bearing composite shim according to claim 13, wherein the laminate structure further comprises a second composite layer laminated to the first composite layer, wherein the second composite layer includes a plurality of axial fibers.

15. A laminated bearing composite shim according to claim 13, wherein the first composite layer comprises a plurality of fibers that are concentrically oriented.

16. A laminated bearing composite shim according to claim 13, wherein the plurality of fibers that are concentrically oriented are arcuate shaped fibers.

17. A laminated bearing composite shim according to claim 16, wherein the plurality of arcuate shaped fibers form a plurality of circles oriented as concentric rings.

18. A laminated bearing composite shim according to claim 14, wherein the second composite layer comprises a plurality of laminated composite sublayers.

19. A laminated bearing comprising:
a plurality of resilient layers; and
a plurality of non-extensible shims alternating with and laminated to the plurality of resilient layers, wherein at least one of the non-extensible shims is a composite shim having an outer circumference and a laminate structure comprising a first composite layer including at least one spiral circumferential fiber which surrounds a portion of said first composite layer with said at least one spiral circumferential fiber proximate said composite shim outer circumference.

20. A laminated bearing according to claim 19, wherein the composite shim having a laminate structure further comprises a second composite layer including a plurality of axial fibers, and wherein the first composite layer has a first side and a second side opposite the first side and the second composite layer has a first side and a second side opposite the first side, and wherein the first side of the first composite layer is laminated to the first side of the second composite layer.

21. A laminated bearing according to claim 19, wherein the composite shim has a thickness between about 0.01 inches to about 0.5 inches.

22. A laminated bearing according to claim 20, wherein the composite shim having a laminate structure further comprises a third composite layer including a plurality of axial fibers and wherein the third composite layer is laminated to the second side of the first composite layer.

23. A laminated bearing according to claim 22, wherein the second composite layer comprises a plurality of laminated composite sublayers, and wherein the third composite layer comprises a plurality of laminated composite sublayers.

24. A laminated bearing according to claim 23, wherein the composite sublayers of the second and third composite layers include uniaxial fibers.

25. A laminated bearing according to claim 24, wherein the uniaxial fibers of each of the composite sublayers of the second and third composite layers are oriented along an axis defining an axis of each of the composite sublayers, and wherein the composite sublayers are arranged such that the axes of adjacent composite sublayers are offset by an angle.

26. A laminated bearing according to claim 25, wherein the second composite layer includes at least four composite sublayers, and wherein the third composite layer includes at least four composite sublayers.

27. A laminated bearing according to claim 26, wherein the four composite sublayers of the second composite layer are arranged such that their respective axes are in a 0°, +45°, −45°, and 90° orientation, and wherein the four composite sublayers of the third composite layer are arranged such that their axes are in a 90°, −45°, +45°, and 0° orientation.

28. A laminated bearing non-extensible composite shim for use with a laminated bearing resilient layer, said non-extensible composite shim having an outer circumference and a laminate structure comprising a first composite layer including at least one spiral fiber that circumferentially surrounds a portion of the first composite layer with said at least one spiral fiber proximate said composite shim outer circumference.

29. A laminated bearing non-extensible composite shim according to claim 28, wherein the at least one spiral fiber is a hoop wound fiber selected from the group consisting of carbon, graphite, glass, aramid and boron.

30. A laminated bearing non-extensible composite shim according to claim 28, wherein the first composite layer is comprised of a plurality of concentric fiber circles.

31. A laminated bearing non-extensible composite shim according to claim 28, wherein the laminate structure further comprises a second composite layer including a plurality of axial fibers, and wherein the first composite layer is comprised of a plurality of concentric fiber circles.

32. A laminated bearing non-extensible composite shim according to claim 28, further comprising at least one second composite layer comprising a plurality of radially extending fibers, and at least one third composite layer comprising a plurality of uniaxial fibers.

33. A laminated bearing non-extensible composite shim according to claim 28, wherein the shim is frustoconical.

34. A laminated bearing non-extensible composite shim according to claim 28, wherein the shim is cylindrical.

35. A laminated bearing non-extensible composite shim according to claim 26 wherein the laminate structure includes a plurality of composite layers.

36. A laminated bearing non-extensible composite shim according to claim 31, wherein the laminate structure includes a plurality of composite layers with axial fibers.

37. A laminated bearing non-extensible composite shim according to claim 26 wherein the laminate structure further comprises a second composite layer including a plurality of radial fibers.

38. A laminated bearing non-extensible composite shim according to claim 36 wherein the axial fibers of said composite layers are oriented at different angles.

39. A laminated bearing non-extensible composite shim according to claim 34, wherein the composite shim has a plurality of fibers surrounding a central axis.

40. A laminated bearing non-extensible composite shim according to claim 34 wherein the composite shim further comprises a plurality of circumferential fibers.

41. A laminated bearing non-extensible composite shim according to claim 39, wherein the central axis is a longitudinal axis, the composite shim further comprising at least one longitudinal fiber and the at least one longitudinal fiber being oriented in the direction defined by the longitudinal axis.

42. A laminated bearing non-extensible composite shim according to claim 41, wherein the composite shim further comprises at least one outer periphery lateral fiber.

43. A laminated bearing non-extensible composite shim according to claim 38 wherein the shim includes a plurality of first, second and third composite layers.

* * * * *